United States Patent Office 3,536,402
Patented Oct. 27, 1970

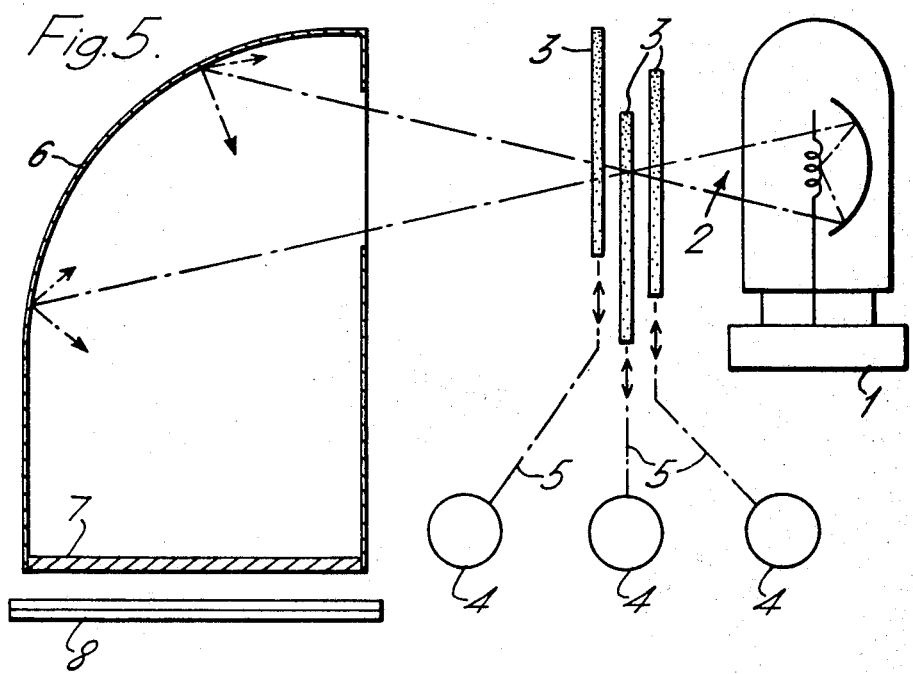
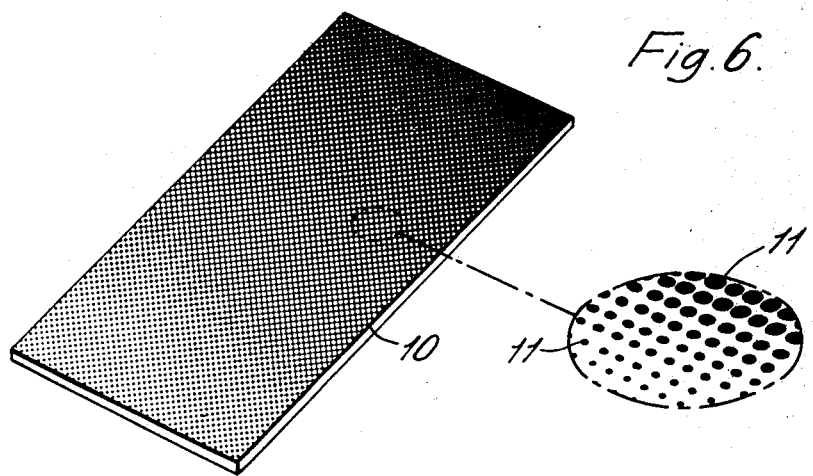

3,536,402
COLOUR CORRECTION FILTER
Keith Aston, North Cheam, England, assignor to The Pavelle Corporation, New York, N.Y., a corporation of New York
Filed Dec. 5, 1967, Ser. No. 688,052
Claims priority, application Great Britain, Dec. 5, 1966, 54,403/66
Int. Cl. G03b 27/76
U.S. Cl. 355—35   16 Claims

ABSTRACT OF THE DISCLOSURE

A color correction filter for use with photographic exposure apparatus comprises a light transmitting base plate on which an interference film is deposited to define a pattern of interspersed film and non-film portions. The interference film blocks transmission of a first selected band of optical wavelengths while passing all other wavelengths of the exposing light source, while the non-film portions transmit the exposing light beam unchanged. The density of the filter is dependent upon the ratio of the film area to the non-film area. By varying the ratio of film to non-film portions across the filter, the density of the filter is caused to vary progressively so that movement of the filter will cause a change in the amount of light of the selected band transmitted by the filter. A similar film may be deposited on the other side of the base plate for the purpose of blocking a second band of optical wavelengths.

This invention relates to improvements in or relating to colour correction filters in or for photographic colour printing or enlarging apparatus.

It is well known that when making photographic copies from colour negatives or positives, it is necessary in the great majority of cases to introduce some form of colour correction in order to produce a result which has the desired colour balance. One method of doing this is to expose by white light (i.e. light containing blue, green and red colour components) and to modify the proportions of these three components in the exposing light beam by the introduction of tinted subtractive filters into the beam. Subtractive filters are available commercially in a range of densities for the three colours yellow, magenta and cyan. Light of almost any desired colour can be obtained by the use of subtractive filters either singly or in various combinations of colours and densities.

Unfortunately, these filters suffer from certain disadvantages of which the two most serious are:

(1) They are liable to fade and are not resistant to high temperatures and cannot therefore be used in high intensity light beams.

(2) Their spectral absorption and transmission characteristics are far from ideal.

FIG. 5 is a side view of a color head for an enlarger in accordance with the invention, and FIG. 6 is an interference filter showing an enlarged scrap view in accordance with the invention.

Figure 2:
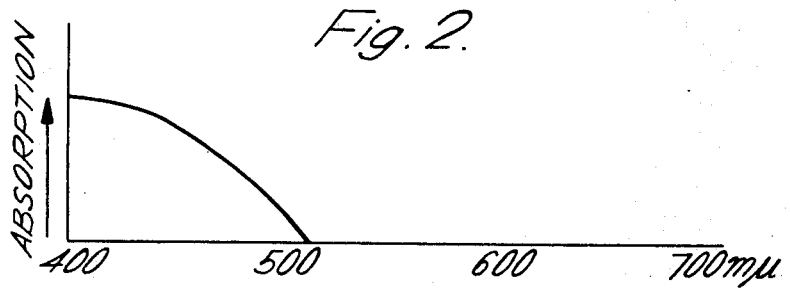
FIG. 2 is an absorption curve of a yellow subtractive filter.

One typical example will serve to illustrate the latter objection. FIG. 2 of the accompanying drawings illustrates the absorption curve of a yellow subtractive filter.

Figure 1:
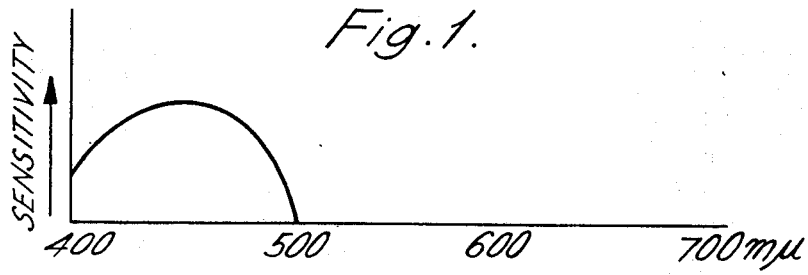
FIG. 1 is a typical sensitivity curve of blue-sensitive photographic material.
Figure 3:
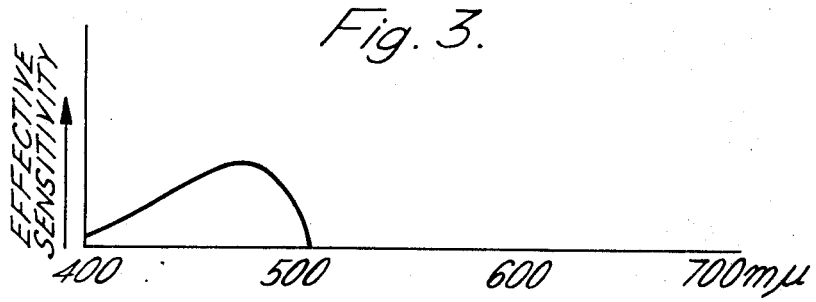
FIG. 3 is an effective sensitivity curve of the filter of FIG. 2 used in conjunction with blue-sensitive photographic material.

It will be noticed that it absorbs much more heavily in the blue-violet region than in the blue-green region. Consequently, when it is used in conjunction with a blue-sensitive photographic material, of which FIG. 1 of the accompanying drawings is a typical curve, the sensitivity at short wavelengths is restrained much more heavily than the sensitivity at the longer wavelengths due to the greater absorption at shorter wavelengths and the resulting effective sensitivity is as shown in FIG. 3 of the accompanying drawings. Both the shape of the sensitivity curve and the position of the maximum sensitivity is considerably changed.

Figure 4:
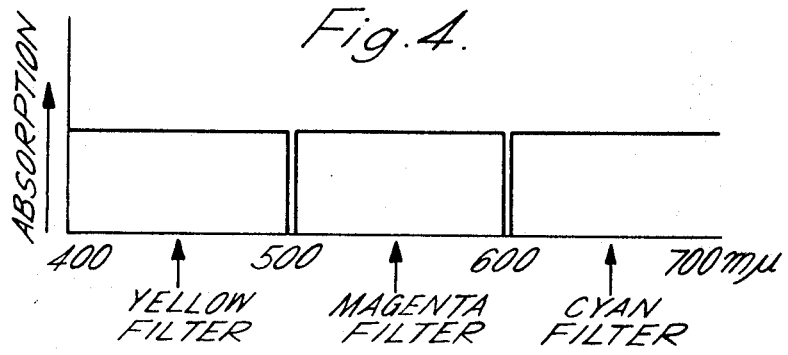
FIG. 4 is an ideal or desired absorption curve for interference filters.

Effects due to the variation of the absorption of a filter with wavelength occur in all three layers of a colour-sensitive photographic material when complementary subtractive filteres are employed. This disadvantage arises from the fact that subtractive dye filters cannot be produced which absorb evenly throughout the waveband that it is desired to suppress. Ideal absorption characteristics of subtractive filters for the three colour components yellow, magneta and cyan are indicated in FIG. 4 of the accompanying drawings. It will be seen that these ideal filters absorb evenly throughout their appropriate wavebands and transmit freely in the adjacent wavebands.

The disadvantages of available subtractive colour filters are well known. If used in high densities they are liable to produce a degradation of colour, a lack of proper colour separation and a loss of contrast in the effected colour image or images. This is due, in part at least, to distortion of the original sensitivity curves of the photosensitive emulsions due to absorption peaks in the colour correction filters. A further disadvantage of absorption filters is that they have secondary absorption characteristics in colours that they are supposed to transmit freely, thereby wasting light and giving undesired results.

The use of "interference filters" as disclosed in our patent application No. 12,058/66 (Ser. No. 54,403) which are manufactured by vacuum coating techniques for example has made a great improvement in the colours available. Such interference filters can be made to reflect strongly over almost any desired waveband, and to transmit freely in the other wavebands and can be made light-fast (i.e. resistant to fading) and heat resistant and thus overcome the worst objections of absorption filters employing dyestuffs. It is however, difficult and expensive to manufacture interference filters in a variety of densities and when such filters are produced in low densities they tend to have irregular reflection/transmission characteristics at various wavelengths within the waveband they are intended to reflect and thus suffer from much the same disadvantage as an absorption filter.

In order to produce an approximation to the ideal filters of FIG. 4 interference filters which give almost complete cut-off in the desired waveband may be employed and the filtered light beam may then be diluted with unfiltered light to give the required colour density. For example a 50% transmission of blue light can be obtained by using an interference filter that gives substantially complete reflection of blue light and then mixing the filtered light with an equal amount of unfiltered light. One practical way of doing this is to partially introduce an interference filter into a light beam so as to impart a strong colouration to part of the cross section of the beam and then highly mix the resulting light by means of, for example, a diffuser box having a white interior. This method is effective and is infinitely variable, according to the amount of the light beam that is intercepted by the filter. Unfortunately, it suffers from the two following disadvantages:

(1) It is difficult to make the intensity of the light vary linearly with the movement of the filter, i.e. equal movements of the filter should produce equal percentage changes in light intensity. This can be accomplished by suitable shaping of the filter and/or light aperture, but this involves some sacrifice of the maximum light available.

(2) It is necessary highly to diffuse the light after filtering in order completely to mix the filtered light with the unfiltered light. This again involves considerable loss of light.

It is the object of the present invention to avoid or at least substantially reduce the above mentioned disadvantages.

According to the present invention therefore, there is provided in or for a photographic colour printing or enlarging apparatus at least one interference filter consisting of a thin interference film upon a base plate, said interference film being so deposited upon the base plate as to form coated and uncoated areas which are small in relation to the total area of the base plate the coated (or uncoated) areas being surrounded by uncoated (or coated) areas, the coated areas serving to reflect the undesired wavelengths and transmit substantially all other wavelengths of the exposing light beam of the said apparatus and the uncoated areas serving to transmit the exposing light beam substantially unchanged.

In this way the light transmitted through the interference filter is a mixture of unchanged light transmitted through the uncoated areas and colour corrected light transmitted through the coated areas. The ratio of the total uncoated to coated area of the filter will determine the overall density of the filter and may either be constant throughout the area of the filter or may change progressively through the length of the filter so that the filter may be moved across the exposing light beam for adjustment of its effective density. The coated areas desirably give a heavy or substantially complete suppression of light of the wavelengths that it is desired to suppress.

The configuration of the uncoated and coated areas may be in any form but dots simliar to the pattern of a half-tone printed picture are usually quite suitable.

A simple method of producing these filters is to coat the surface of completely coated interference filters with a photo-resist. The photo-resist layer is exposed with a negative containing the desired area configuration and the resist is then developed in the normal way to remove the unhardened (unexposed) areas of the resist. Such techniques are well known per se for example in metal engraving and printed circuit fabrication. The filter with only the hardened (exposed) resist pattern on it is now treated with a solution which will etch and remove the filter coating in areas not protected by the hardened resist. Suitable etching solutions vary according to the substances used in the production of the interference coatings, but commercial hard-coated filters etch rapidly and cleanly with dilute aqueous hydrofluoric acid solution of about 1% to 5% strength. Sodium fluoride and caustic alkali solutions may also be used. After etching, the filter is washed and dried and the remaining resist image is removed with a suitable organic solvent which will not affect the underlying interference coating. Typical solvents are trichloroethylene, chloroform and xylene for example.

Alternatively it is possible to print a resist pattern on to the filters prior to etching by any of the well known printing techniques such as silk-screening for example. The direct photographic method, however, ensures accurate control and fine definition.

The desired area configuration can easily be obtained by the usual techniques used in the production of half-tone blocks in the printing industry. A filter of logarithmic gradation, for example, can be made by making a half-tone reproduction from an ordinary photographic grey wedge. The resulting dot-pattern is then printed on to the filter in the form of a resist layer by one of the methods previously referred to and the filter is subsequently etched to remove the interference coating in the unprotected areas in the manner previously described.

The filters according to the present invention cannot normally be used very satisfactorily in an image-producing lens system. This is because some scattering of light occurs not only because of slight surface irregularities caused by the etching but also because of diffraction effects caused by the dots themselves. The filters according to the present invention are, however, very satisfactory for use in the light beam of an illuminating system and, because of the fineness of the pattern, very little if any subsequent diffusion of the light is required in order to obtain perfect mixing. Such filters can be used in a condenser system of illumination as well as in diffuser systems.

Filters in accordance with the persent invention can not only have a close approach to ideal spectral absorption characteristics, but are also substantially heat resistant and fast to light. Such filters can conveniently be employed at or near the focus of a high intensity projection lamp containing an integral reflector. In such a position, the cross section of the light beam is small, and extremely intense. The light can then subsequently be used for illuminating a negative or transparency by any conventional system involving condenser lenses and/or diffusers.

According to a further aspect of the present invention there is provided a colour head in or for a photographic colour printing or enlarging apparatus including at least two colour correction interference filters individually movable across the path of the exposing light beam each said filter consisting of a thin interference film upon a base plate, said interference films being so deposited upon the base plate as to form coated and uncoated areas which are small in relation to the total area of the base plate, the coated (or uncoated) areas being surrounded by uncoated (or coated) areas, the coated areas serving to reflect the undesired wavelengths and transmit substantially all other wavelengths of the exposing light beam and the uncoated areas serving to transmit the exposing light beam substantially unchanged.

A colour head for a photographic colour printer or enlarger according to the present invention normally contains three graduated interference filters, one for reflecting each of the three primary subtractive colours (cyan, magenta, and yellow) and each separately mounted and movable in the light-beam. Alternatively, individual filters each for a variety of colours and densities may be provided and may be individually inserted into the exposing light beam as required. This latter method is more suitable for semi-permanent "basic" filtering of a light-beam, where frequent changes are not required, and where filtering need not be infinitely variable, but may be adjusted in "steps."

It is evident that a multiplication of the techniques described can be used to produce more complex colour correcting systems. For example, the transparent base plate may have interference coatings which transmit different colours on opposite surfaces and these coatings may be separately printed in a graduated form so that movement of the filter will change the transmitted colours at different rates, or in opposite directions. One use for such a filter is in obtaining balance between two different colours, where one colour can be increased and the other decreased simultaneously. Another use for a double-coated filter is to make one coating provide compensation for changes in secondary transmission/reflection characteristics of the other coating, as its density is altered.

Reference has been made to colour correction apparatus involving partial insertion of a full-density filter into a light beam so as to colour part of the beam and subsequent mixing of the light. Such apparatus can be combined with the filter according to the present invention. For example if a filter which is being partially inserted into a light beam has its leading edge of lighter density, or of graduated density, a more suitable modification of the light relative to filter movement can be obtained.

The foregoing description, given by way of example only, of methods of producing interference filters in lighter densities or in graduated form includes the use of fully coated filters to start with, as such filters are commercially available. It is, of course, possible that by means of special techniques such as masking during manufacture, methods could be devised to produce the required filters directly.

In order that the invention may be more clearly understood an embodiment of a colour head in or for a photographic colour printing or enlarging apparatus according to the invention will now be described by way of example only with reference to the diagrammatic representations shown in FIGS. 5 and 6 of the accompanying drawings which show, respectively, the hereinafter described embodiment and a typical interference filter provided therein.

The embodiment shown includes a lamp housing wherein is mounted a lamp 1 having a built in internal reflector wherby a converging light beam 2 is produced which converges to a focal point about an inch in front of the lamp 1.

For the lamp 1 three movable interference filters 3 are provided each having coated areas in the form of uniform dots adapted to reflect a different one of the three primary colours normally used in colour photography and to transmit the other two basic primary colours, and uncoated areas which transmit all three basic primary colours. The density of each filter is determined by the ratio of the coated to the uncoated areas thereof and is arranged to be graduated in the direction of movement of the filter. FIG. 6 shows diagrammatically a typical interference filter which consists of a transparent base plate 10 about half an inch wide and two inches long which carries a thin interference film in the form of uniform dots 11 (see enlarged scrap view) which reflect one of the primary colours. The illustrated filter is graduated, the graduation being obtained by progressively increasing the size of the dots throughout the length of the filter whilst retaining the number of dots per unit area substantially constant (typically 1600 per sq. inch), so that at one end the base plate is 10% coated and 90% uncoated and at the other end is 90% coated and 10% uncoated.

Thus in front of the lamp 1 a filter bank is provided consisting of three interference filters 3, each filter 3 being capable of reflecting to a predetermined degree a different one of the three basic primary colours and of transmitting the other two of said primary colours. Each filter 3 is separately movable into and out of the exposing light beam 2 so that, the filters 3 being of graduated density in their direction of movement, the beam 2 is filtered to differing extents at different positions of the filter 3. In order to obtain the correct colour balance in the print the three filters 3 may be introduced into the exposing beam to different extents so as to present different effective densities thereby to bring the colour balance of the exposing light beam into correspondence with the desired colour balance of the print. In this way the exposing light beam may be colour corrected to suit the particular negative or transparency from which the print is to be taken. Printing of the negative or transparency may then be effected in one exposure.

The filters are mounted in carriers (not shown) which are conveniently movable each by means of a rotatable knob 4 which operates a mechanical linkage 5 for example. Since the interference filter coating absorbs only very little energy from the exposing light beam the filter bank can safely be positioned at or near the focus of the beam and consequently the filters can be of quite small size, for example 1–2 cm.²

The light transmitted through the filter bank is allowed to diverge and enter a conventional diffuser box 6 having a white interior and incorporating a diffusing screen 7 of opal plastics material for example and the diffuse light from this box is employed to illuminate the negative 8. The illuminated negative is projected by means of a conventional lens system (not shown) onto the photographic printing material (not shown).

Thus in use of the apparatus to print a colour negative or transparency the colour balance of the negative or transparency and the corresponding colour balance of the exposing light beam necessary to produce the desired colour balance in the print are first determined either empirically by making a number of test exposures or automatically by grading the negative or transparency photoelectrically and the filter positions are set accordingly. The exposing light beam having been colour corrected to obtain the desired colour balance the negative or transparency is exposed to the colour corrected exposing light beam for a predetermined duration to produce prints of proper colour balance.

I claim:
1. A filter for use with photographic exposure apparatus, comprising:
   a light transmitting base plate,
   a color-responsive film deposited on at least one surface of said base plate in a pattern defining interspersed film and non-film portions, said film portion blocking transmission of a first selected band of optical wavelengths while transmitting a band of other wavelengths of an exposing light source, with the non-film portions serving to transmit said band of other wavelengths substantially unchanged, the density of said filter being dependent upon the ratio of the area of said film portion to the area of said non-film portion.

2. A color correction filter according to claim 1, wherein said ratio per unit area varies as measured in at least one direction along said surface.

3. A filter according to claim 2, wherein said ratio per unit area changes progressively.

4. A filter according to claim 1, wherein one of said film or non-film portions comprises a plurality of discrete areas unconnected to each other and surrounded by the other of said portions.

5. A color correction filter according to claim 4, wherein said ratio per unit area varies as measured in at least one direction along said surface.

6. A filter according to claim 5, wherein said ratio per unit area changes progressively.

7. A filter according to claim 1, including a second color-responsive film deposited on the other surface of said base plate in a predetermined pattern defining second interspersed film and non-film portions, said second film portion blocking transmission of a second selected band of optical wavelengths while transmitting substantially all other wavelengths of the exposing light source, with the second non-film portion serving to transmit the exposing light beam substantially unchanged, the density of said filter being further dependent upon a second ratio of the area of said second film portion to the area of said second non-film portion.

8. A filter according to claim 7, wherein each of said ratio per unit area varies as measured in at least one direction along said surface.

9. A filter according to claim 8, wherein each of said ratio per unit area changes progressively.

10. A filter according to claim 9, wherein the rate of change of said first named ratio per unit area is different from the rate of change of said second ratio per unit area as measured in said one direction, whereby movement of the filter in said one direction in an exposing light beam causes the transmitted colors to change at different rates.

11. A filter according to claim 9, wherein one of said ratios per unit area increases as measured in said one direction and the other of said ratios per unit area decreases as measured in said one direction whereby movement of said filter in said one direction in an exposing light beam causes an increase in the transmission of one color and a simultaneous decrease in the transmission of another color.

12. A filter according to claim 7, wherein one of said film or non-film portions comprises a plurality of discrete areas unconnected to each other and surrounded by the other of said portions.

13. For use with photographic exposure apparatus, at least two color correction filters, each of said filters comprising:
   a light transmitting base plate,
   a color-responsive film deposited on at least one surface of said base plate in a predetermined pattern defining interspersed film and non-film portions, said film portion blocking transmission of a first selected band of optical wavelengths while transmitting substantially all other wavelengths of an exposing light source, each of said film portions adapted to block transmission of a different selected band of optical wavelengths, with the non-film portions serving to transmit the exposing light beam substantially unchanged, the density of said filter being dependent upon the ratio of its film portion to its non-film portion, and
   means for moving said filters individually across the path of the exposing light beam in at least one direction.

14. Apparatus according to claim 13, wherein the ratio of said film portion per unit area to said non-film portion per unit area changes for each of said filters as measured in said one direction.

15. Apparatus according to claim 14, including three of such filters, said filters being adapted to respectively block transmission of optical wavelengths corresponding to three primary subtractive colors.

16. Apparatus according to claim 13, wherein one of said film or non-film portions comprises a plurality of discrete areas unconnected to each other and surrounded by the other of said portions.

References Cited

UNITED STATES PATENTS 3,217,594  11/1965  Simmon _____ 355—35 X

NORTON ANSHER, Primary Examiner

R. A. WINTERCORN, Assistant Examiner

U.S. Cl. X.R.

350—311, 314, 315, 316; 355—71